United States Patent

Dern

Patent Number: 5,413,055
Date of Patent: May 9, 1995

[54] ALL TERRAIN SEEDER

[76] Inventor: George K. Dern, 30 Squaw Creek Ct., Lander, Wyo. 82520

[21] Appl. No.: 95,532

[22] Filed: Jul. 22, 1993

[51] Int. Cl.⁶ .............................................. A01C 5/00
[52] U.S. Cl. ..................................... 111/130; 111/52; 111/77; 111/146; 172/451; 172/517
[58] Field of Search ....................... 111/11, 12, 13, 52, 111/77, 70, 85, 145, 130, 197, 198, 924, 131, 132, 133, 134; 172/174, 311, 421, 397, 509, 517

[56] References Cited

U.S. PATENT DOCUMENTS

| | | | |
|---|---|---|---|
| 2,812,732 | 11/1957 | Meisdalen | 111/77 X |
| 3,543,704 | 12/1970 | Hansen | 111/52 |
| 3,828,702 | 8/1974 | Bowman | 111/197 |
| 4,048,929 | 9/1977 | Zumbahlen | 111/146 |
| 4,117,893 | 10/1978 | Kinzenbaw | 111/14 X |
| 4,212,254 | 7/1980 | Zumbahlen | 111/52 |
| 4,244,306 | 1/1981 | Peterson et al. | 111/52 X |
| 4,265,186 | 5/1981 | Nichols | 111/145 |
| 4,307,674 | 12/1981 | Jenning et al. | 111/164 |
| 4,579,071 | 4/1986 | Johnson | 111/195 |
| 4,677,922 | 7/1987 | Shrull et al. | 111/52 |
| 4,717,289 | 1/1988 | Popowich et al. | 111/77 X |
| 5,082,126 | 1/1992 | Ribouleau | 111/77 X |

Primary Examiner—Dennis L. Taylor
Assistant Examiner—Robert Pezzuto
Attorney, Agent, or Firm—Eugene M. Eckelman

[57] ABSTRACT

A seeder designed to seed all types of terrain including remote disrupted areas such as pipelines, oil wells, and the like. The seeder has a seeder box that is designed to be carried on the front of a vehicle and soil firming wheels on a drawbar that is pulled behind the vehicle. The seeder box has flexible discharge tubes that prevent influence from the wind on the seed being discharged and that are flexible and provide random, non-symmetrical planting. The seeder box can include more than one section, with each section having a hinged support providing positioning in horizontal or inclined planes. The press rings are associated with a mounting frame on the drawbar that allows each ring to adjust vertically according to the contour of the seeded ground. The drawbar supports a harrow ahead of the soil firming rings and also may support an auxiliary seeder.

19 Claims, 4 Drawing Sheets

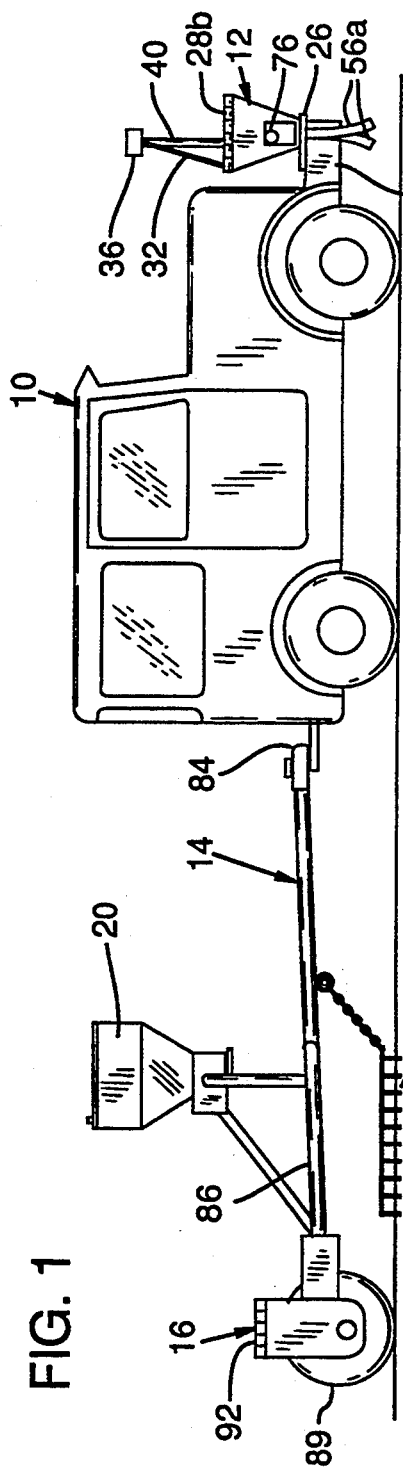
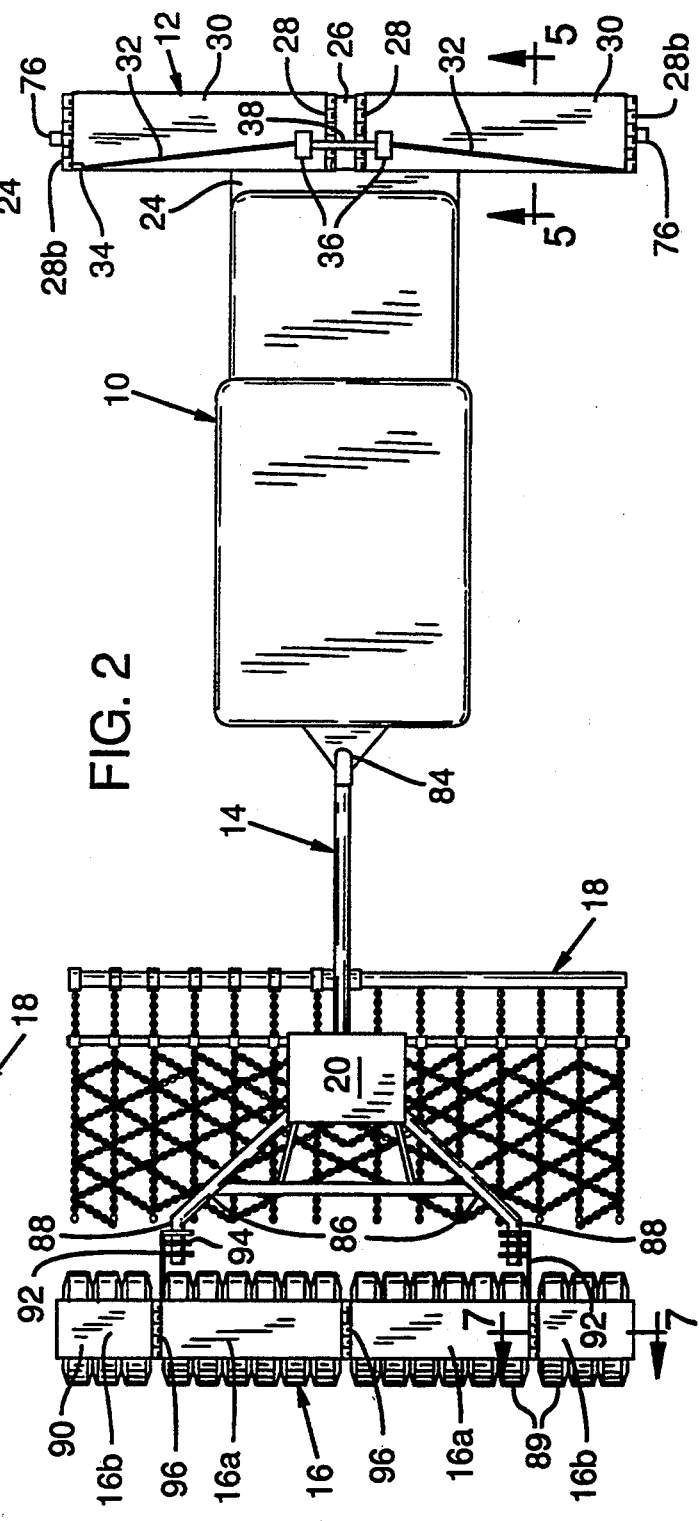

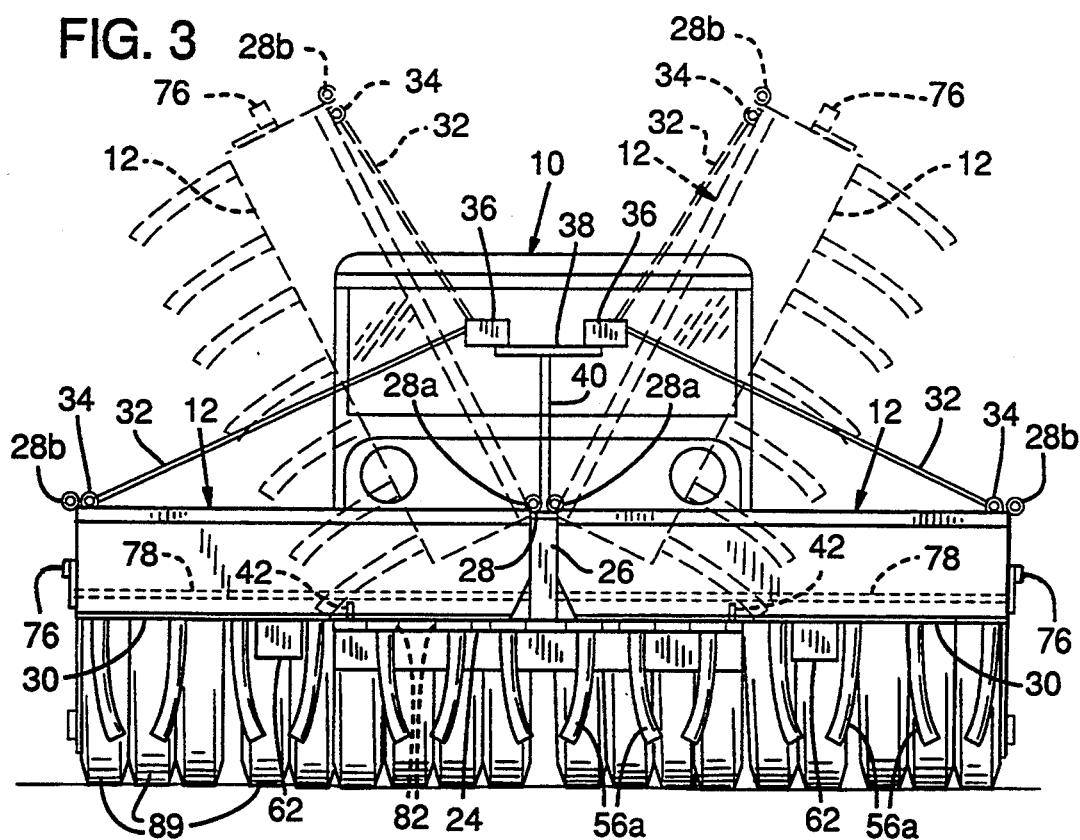
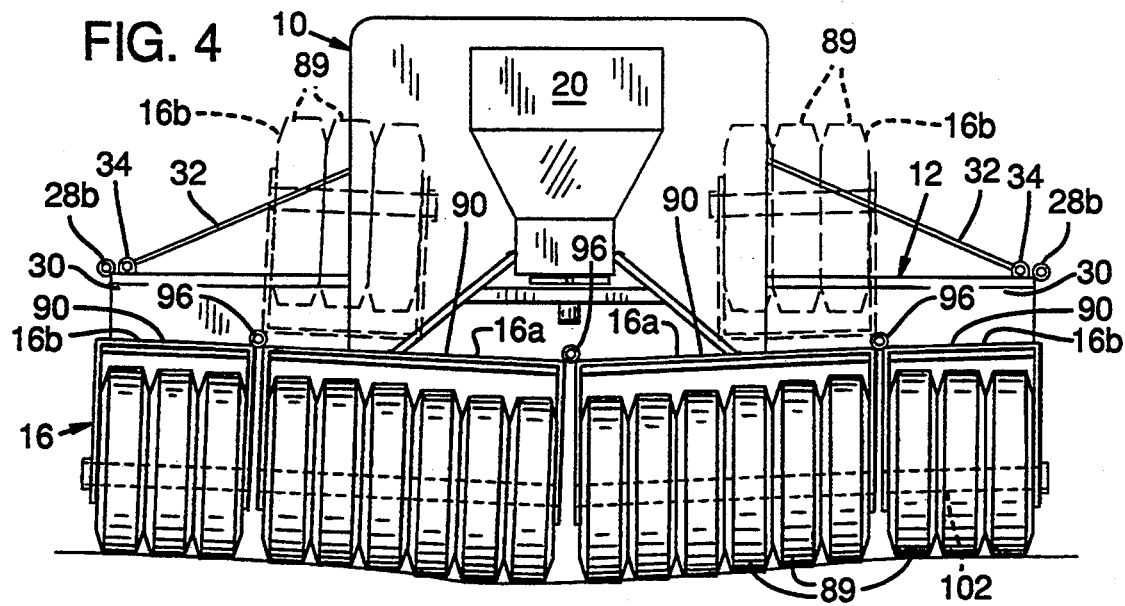

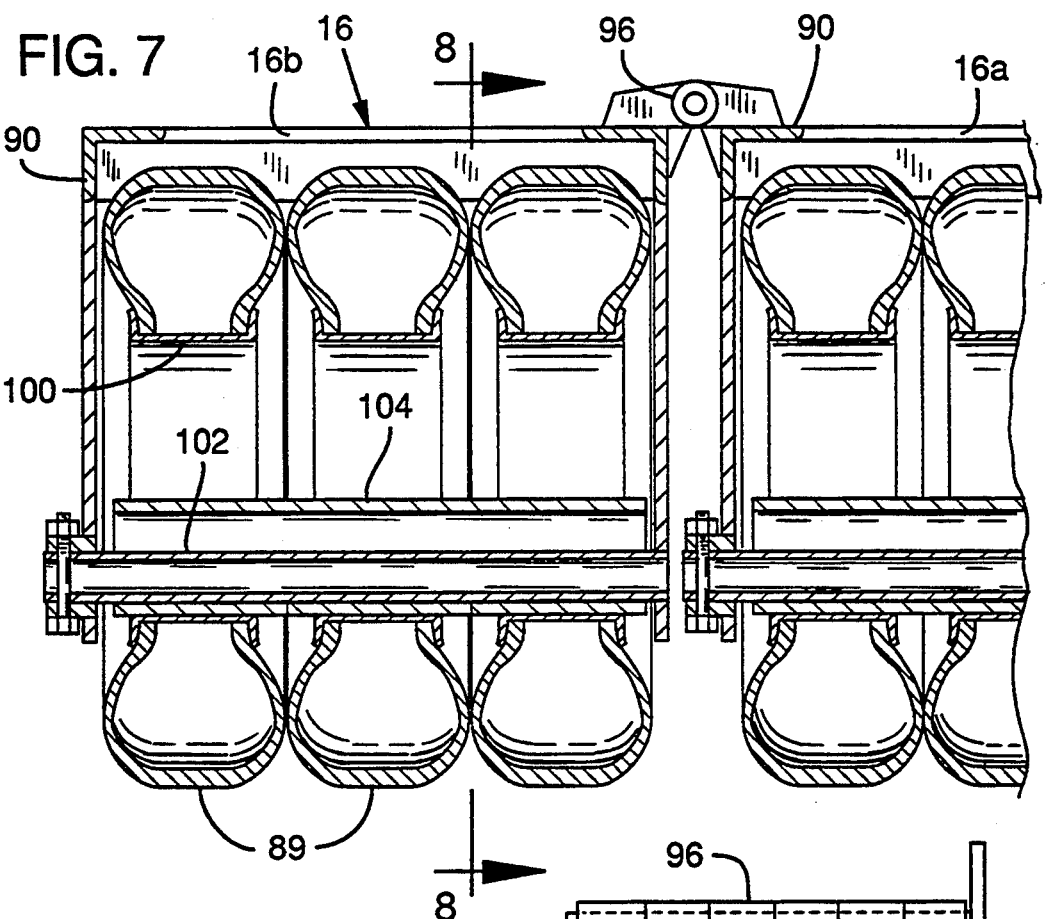
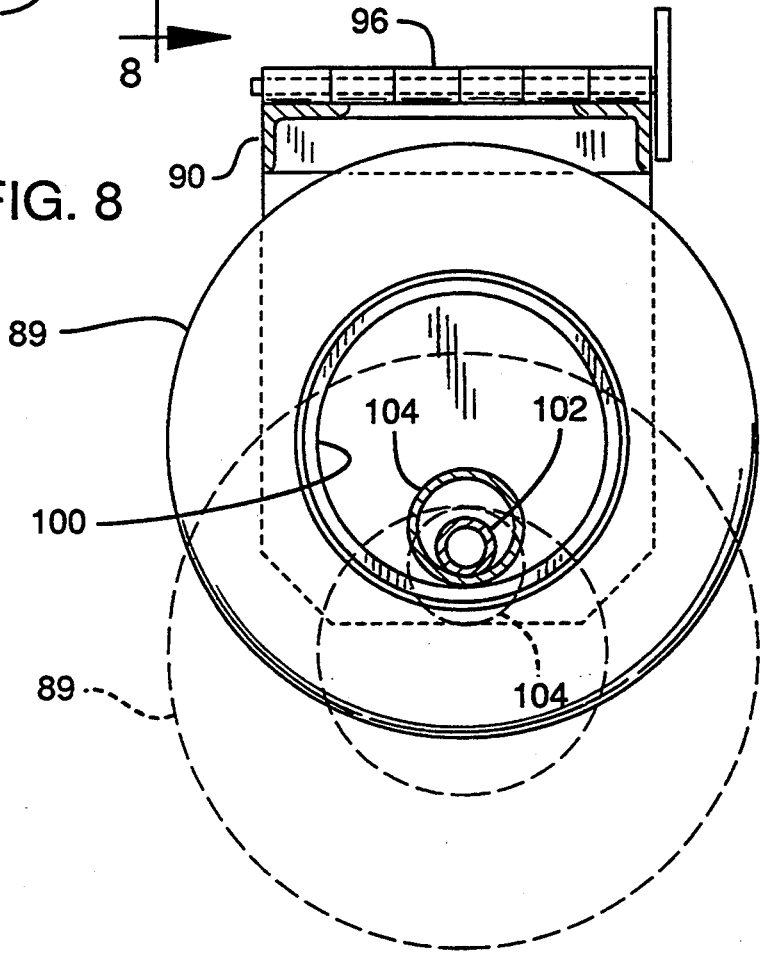

ALL TERRAIN SEEDER

BACKGROUND OF THE INVENTION

This invention relates to a new and novel all terrain seeder.

Various types of devices are employed for planting seeds. For example, popular seeders of this type are broadcast seeders and seedbox row seeders. Each of these two types of seeders has its advantages and disadvantages. For example, broadcast seeders, while operating satisfactorily in spreading some types of seed, do not function well for light or fluffy seed. Broadcast seeders also have the disadvantage of not working satisfactorily under windy conditions. Row seeders in general operate satisfactorily in some conditions, i.e. conditions where the seed is of a type that can be deposited downwardly through seed orifices or tubes and in conditions where it is acceptable or desirable that the pattern of the growing plants is in well defined rows.

Modern ecology has extended to disrupted remote areas, for example, areas where pipelines have been laid, oil wells abandoned, or the like. It is often required and also desired that disrupted ground areas of this type be seeded with grass or plants of a type similar to that of the adjacent area. It is also desired that seeding be accomplished in a random pattern so that when the grass or plants are grown, planted symmetrical rows are not apparent, particularly from the air. These remote areas often have a rough and rocky terrain and also have sharp contours, thus making the areas difficult to seed. Also, many of the areas, such as mountaineous areas for example are subject to severe wind conditions.

SUMMARY OF THE INVENTION

The present all terrain seeder accomplishes important advantages in seeding, particularly in remote areas, and has the following principal objects. The objects are to provide a structure that is designed for easy attachment to a support vehicle; that will operate on substantially all types of terrain; that has a novel seed box which sows seed in a random pattern and also deposits it close to the ground to prevent wind from interfering with the distribution of the seed, and that includes metering and seed discharge structure which provides an efficient discharge of seed, and further that includes structure which facilitates the seeding of roadway banks and other slopes; that includes a novel soil firming trailer that provides improved soil treatment after seeding; that contributes to efficient germination; that includes a novel rear draw bar for the soil firming trailer capable of also supporting a harrow and if necessary capable of supporting a broadcast seeder used in combination with the soil firming trailer or independently; and that includes a seed box and soil firming trailer that can be compacted in size to reduce the width of the structure for transportation or storage.

In carrying out the objects of the invention, a seeder box is capable of being mounted transversely on the front of a vehicle and has feed tubes that extend close to the ground to reduce the effects of wind on the seed and that are constructed of a material that is sufficiently flexible so as to oscillate and wiggle by movement of the vehicle and other forces and insure a random, non-symmetrical pattern of seed deposit on the soil. The seeder box has powered paddle inducing discharge means and powered controlled outlet orifices to the feed tubes. Said box may have two sections which are preferably hinged to the vehicle and capable of positioning in a horizontal or inclined plane. The seeder box is preferably used with a harrow on a drawbar that also is connected to a soil firming trailer capable of firming the soil after seeding. The soil firming trailer has frame means supported on vertically floating tires or wheels mounted on a shaft and capable of conforming to the contour of the seeded ground. The drawbar may also support a broadcast seeder.

The invention will be better understood and additional objects and advantages will become apparent from the following description taken in connection with the accompanying drawings.

BRIEF DESCRIPTION OF THE DRAWINGS

FIG. 1 is a side elevational view of an all terrain seeder embodying principles of the present invention.

FIG. 2 is a top plan view of the seeder.

FIG. 3 is a front elevational view with parts thereof being shown in broken lines illustrating upwardly angled positions of a seed box thereof.

FIG. 4 is a rear elevation view of the seeder.

FIG. 7 is an enlarged fragmentary sectional view of the soil firming trailer, this view being taken on the line 7—7 of FIG. 2, FIG. 8 is a cross sectional view of the soil firming rings, this view being taken on the line 8—8 of FIG. 7.

DETAILED DESCRIPTION OF A PREFERRED EMBODIMENT

Figure 9:
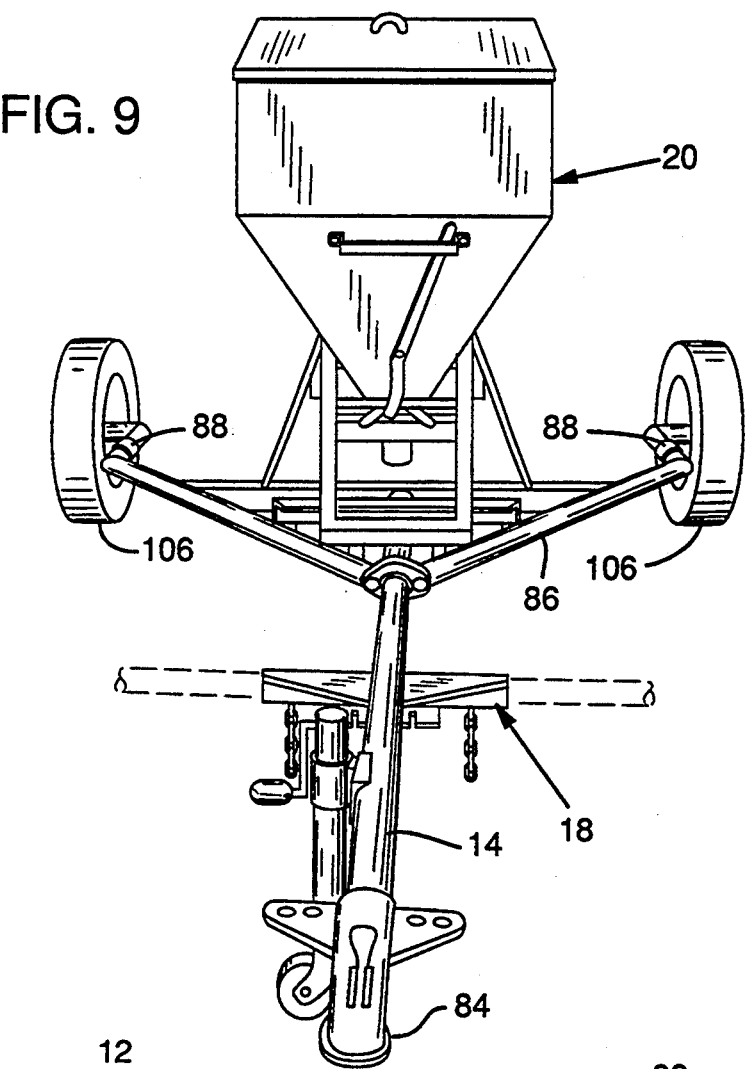
FIG. 9 is a perspective view of a trailer-broadcast seeder conversion of the invention.

Reference is first made to FIGS. 1 and 2 showing in general elements of the invention comprising a driving vehicle 10, a front seeder box 12, a rear drawbar 14, a soil firming trailer 16, a harrow 18, and a broadcast seeder 20. The vehicle 10 may be of different types, a preferred vehicle being a 4-wheel drive automotive vehicle that can negotiate most terrains where seeding is to occur and which at the same time can travel on the highway at a reasonable speed. Structural arrangements can also be such that the seeder is horse drawn.

Using the type of vehicle shown in FIG. 1 as an illustration, the front frame portion of the vehicle has a support platform 24, FIGS. 1–3, integrated therewith on which is fixedly secured a standard 26 having a pair of longitudinally extending integral hinge connections 28 at its top edges. These hinge connections support a pair of oppositely extending seed boxes 30. Outer end support of these seed boxes is accomplished by winch lines 32 connected at such outer ends to eyes 34 on the seed boxes and extending inwardly to winches 36 on a cross arm 38 of a spar pole 40 secured integrally to the vehicle support platform 24.

By suitable operation of the winches 36, the seed boxes 30 can lay horizontally in an outer working position or they can be raised to the broken line position shown in FIG. 3 for transport on the highway or storage, or any tilted position between the two for seeding sloped areas. The hinges 28 are of a piano-type hinge wherein the connecting pins 28a thereof can be removed and the seed boxes disconnected from the standard 26. Also, as seen in FIG. 3, both ends of the seed boxes have an auxiliary hinge section 28b which allows either end to be connected to the standard to allow additional lengths of the seed boxes to be connected endwise thereof for increasing the lateral width of seeding. In the horizontal supported position of the seed boxes on the platform 24, it is preferred that they be secured to the platform. This is accomplished by suitable releasable fastening means 42 such as bolts 42. These bolts are removed when the seed boxes are to be raised.

Figure 5:
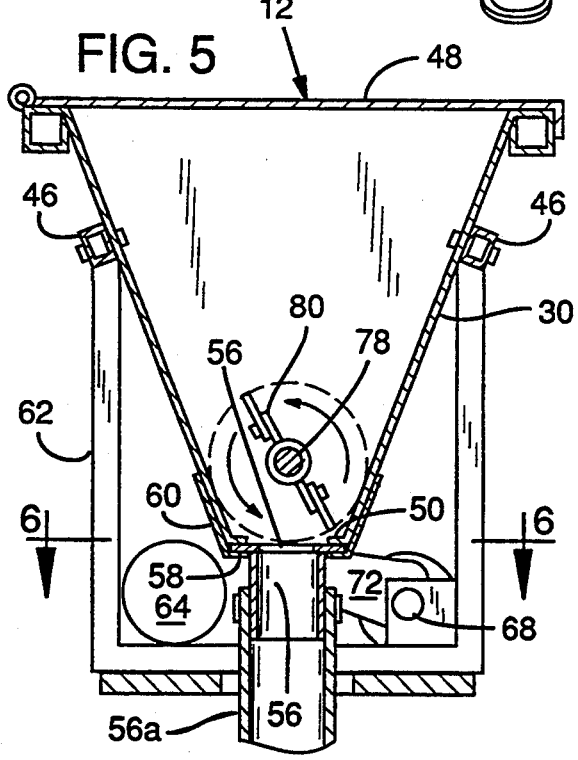
FIG. 5 is an enlarged cross sectional view of the seed box portion of the seeder, this view being taken on the line 5—5 of FIG. 2.

Seed boxes 30 have a narrowing width toward the bottom in a hopper-shape and include longitudinal rigid frame members 46 near the top, FIG. 5, a hinged lid 48, and a flat bottom wall 50 having a plurality of circular orifices 54 spaced thereacross. These orifices are associated with seed discharge tubes 56 secured to a slide plate 58 that is confined in a space between the bottom surface of the seed box and guide members 60 secured to the seed boxes.

Figure 6:
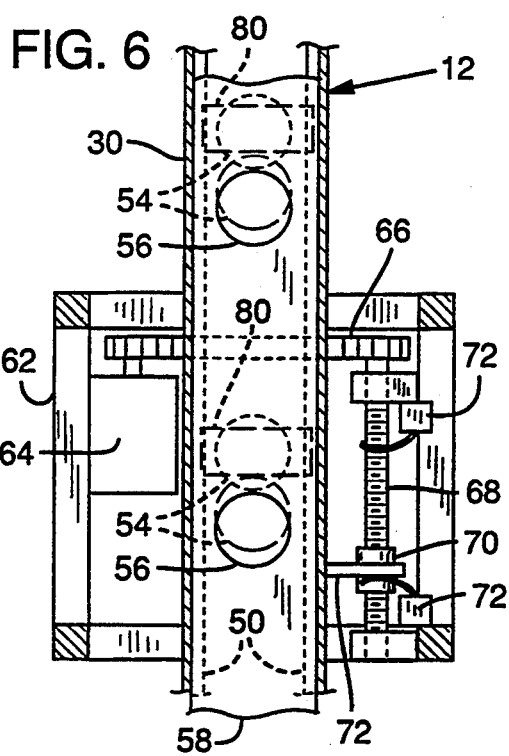
FIG. 6 is a horizontal sectional view taken on the line 6—6 of FIG. 5.

Each of the seed boxes 30 supports a motor housing 62, also seen in FIG. 6, in which is mounted an electric motor 64 having a gear drive 66 for an adjusting screw 68 journaled in the housing 62. Adjusting screw 68 supports a threaded drive nut 70 having an integral lateral arm 72 secured to the metering slide plate 58. The electric source may come from the electrical system of the drive vehicle or from an independent source such as a portable battery.

Upon lateral adjustment of the seed discharge tubes 56 together with the slide plate 58, by means of adjusting motor 64, selected orifice opening and consequent volume of feeding can be controlled. Such is apparent in FIG. 6 wherein the discharge tubes 56 are shown in a selected overlapping feeding position with relation to the orifices 54 in the seedbox, the latter orifices being shown in phantom lines. Drive nut 70 is associated with limit switches 72 to prevent overrunning of the drive nut.

Each of seed boxes 30 supports an end electric motor 76 having a drive connection with a shaft 78 extending the full length of the respective box and journaled in the opposite end from the motor. These shafts support a plurality of paddles 80, one each at the outlet orifices 54 in the bottom of the seed box. Upon driven rotation of the shafts 78, the paddles 80 mix and insure discharge of seed through the orifices. Motors 76 may comprise constant speed motors geared for proper rotation of the shafts 78 or preferably such motors may comprise variable speed motors to vary the speed of the shafts 78 as controlled by the type of seed being spread.

Seed discharge tubes 56 have a bottom flexible extension 56a that is of a length to extend down close to the ground, for example six inches. The support platform 24 has apertures 82, FIG. 3, through which tube extensions 56a in this area extend, the apertures 82 being sufficiently large to allow the desired flexing of the extensions and to allow the latter to thread upwardly through the platform when the seed boxes are raised and lowered. Extensions 56a form a deposit area close to the ground so that wind conditions will not substantially interfere with the area covered by the seeds. In a preferred structure, the extensions 56a are of a plastic or other material that will oscillate, wiggle, or otherwise be moved easily by wind currents or by movements of the supporting vehicle. This flexible movement of the seed tubes 56a causes random seeding which eliminates any symmetrical pattern of growth, such as rows.

Drawbar 14 has suitable connection 84 to the towing vehicle, such as by a ball and socket hitch, FIGS. 1 and 2, and includes a rear flared section 86 terminating in short longitudinal auxiliary tongue ends 88 for connection to the soil firming trailer 16, now to be described.

The soil firming trailer 16 comprises several units or sections of rings 89 including a pair of central units 16a having six rings each, for example, and outer units 16b having fewer rings, such as three for example. Each of the units 16a and 16b comprises an inverted, U-shaped heavy duty plate frame 90, also seen in FIGS. 7 and 8, and each of the inner units 16a has forwardly extending arms 92, FIG. 2, welded thereto and having detachable connection 94 to the rear auxiliary tongues 88 of the drawbar 14. Adjoining sections 16a and 16b are connected to each other by longitudinally extending hinges 96 at their top edges, such hinges allowing pivoting movement of each section in both up and down directions whereby such sections can conform to various contours in the ground and in addition the outer sections 16b can be folded over on top of its adjacent section 16a, as shown in phantom lines in FIG. 4, for traveling or for storage. FIG. 4 shows contoured disposition of the units 16a and 16b on an unlevel grade. The hinge supports 96 allow contouring of the units to substantially all grades and even those grades that are considerably more severe than that shown in FIG. 4.

A novel axle support of the rings 89 allows for individual vertical free gravity adjustment or floating movement of each ring within its unit 90 in addition to the hinged connection 96 of the units 16a and 16b. In such structure, FIGS. 7 and 8, the rings have a large opening 100 through the center which receives rigid cross shafts 102 that are secured to a lower portion of the respective frames 90. Shafts 102 have enlarged wear sleeves 104 thereon, the shafts and wear sleeves being considerably smaller than the internal diameters 100 of the rings and thus the rings are free to adjust vertically by gravity according to the contour of the ground. Rings 89 may comprise rubber tired wheels that have the inner portion thereof cut away to form the enlarged internal diameter, or such rings may simply comprise unmounted tires.

Harrow 18 may be of any suitable conventional construction, namely it is of a type that rakes in the seeds for good germination.

Broadcast seeder 20 is of conventional construction and may or may not be used all the time. Such mounting of this seeder on the drawbar 14, however, may be useful in certain instances as will now become more apparent in the description of the operation of the present invention.

Operation

For accomplishing a seeding function, the hopper 30 is filled and suitable opening of outlet orifices 54 from the seed box, as selectively determined by operation of metering slide plate 58, is determined and set. Also, the speed of the paddles 80 may be set. On level or substantially level ground, the seed boxes are locked in their outward horizontal position by bolts 42, although if slopes are encountered, the seed boxes can be released and angled by suitable operation of the winch means 42. With the seed boxes in operation, the seed will be distributed close to the ground by the flexible tubes 56a and the seed will thus not be substantially influenced in its spreading by the wind. Also, the flexible nature of the tube extensions 56 oscillate or wiggle in different directions and spread the seed in a random or non-symmetrical pattern. Thus, plants grown from the seed take on a normal or natural looking appearance. As the vehicle moves forward, the harrow 18 scratches the surface for burying the seed. The rings 89 on the soil firming trailer 16 firm the soil so that the seeds are combined with the soil for good germination. Tires of rubber or similar materials are the most efficient for the present purpose. They are quiet in operation and efficiently firm the soil around the seed. With the vertical adjustment of sections 16a and 16b relative to each other and with vertical adjustment of each ring relative to adjacent rings, substantially every inch of contoured ground will be pressed down to efficiently cover the seed. Also with the soil firming ring arrangement and their frame section adjustment, the soil firming trailer can roll over rocks, uneven ground and other obstructions and still allow efficient firming operation of the rings.

Broadcast seeder 20 may be used by itself independently of the front seeder boxes in those instances where a broadcast seeder will operate satisfactorily, such as when spreading seed with sufficient mass that it can be thrown. The front seeder will discharge substantially any type of seed, including fluffy seed since the paddles 18 will insure discharge thereof from the seeder box. With the combination of elements as in FIG. 1, it is thus apparent that the front seeder can be used for the lightweight seed and the broadcast seeder at the rear can at the same time distribute the heavier mass seeds.

The device can readily travel from one area to another, and if necessary, the front seeder can be compacted by pulling the seed boxes up to the broken line position as shown in FIG. 3 and the outer press wheel units 16b rotated up as shown in the broken line position in FIG. 4.

The draw bar 14 of the invention and broadcast seeder thereon can be used independently of a feed box and press wheels, as shown in FIG. 9. For this purpose the two rear releasable auxiliary tongue ends 88 are connected to a pair of wheels 106 to form a trailer structure arranged to be hitched to a pulling vehicle.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. An all terrain seeding mechanism for a vehicle comprising:
   at least one seeder box capable of mounting transversely on the front of a vehicle and capable of spreading seed by driven movements of the vehicle,
   a plurality of outlet feed tubes depending in spaced lateral position from each other and receiving seed from said seeder box, said feed tubes having a bottom discharge end disposed closely adjacent the ground,
   said feed tubes being sufficiently flexible such that said feed tubes oscillate and wiggle by movement of said vehicle and other forces to the extent that seed discharged therefrom is deposited on the ground in a haphazard, non-symmetrical pattern.

2. The all terrain seeding mechanism of claim 1 including powered paddle means in said seeder box adjacent said outlet feed tubes for mixing seed to be discharged through said feed tubes and also to assist gravity in discharging the seeds.

3. The all terrain seeding mechanism of claim 1 including adjustable orifice feed means associated with said seeder box to control the rate of discharge of seed through said feed tubes.

4. The all terrain seeding mechanism of claim 1 comprising a support standard capable of mounting the front of a vehicle, and longitudinal hinge means securing one end of said seeder box to said standard, said hinge means providing for a horizontal seeding position of said seeder box or an inclined position for slope seeding and for reducing the lateral dimension of the mechanism for transportation or storage.

5. The all terrain seeding mechanism of claim 4 including winch means capable of support on a vehicle for pivoting said feeder box up to said inclined position.

6. The all terrain seeding mechanism of claim 4 including at least two of said seeder boxes, said seeder boxes being aligned laterally and having adjacent ends thereof hingedly connected to said standard, and winch means operatively associated with said standard for pivoting said seeder boxes to said inclined position.

7. The all terrain seeding mechanism of claim 4 including at least two of said seeder boxes, said seeder boxes being aligned laterally and having adjacent ends thereof hingedly connected to said standard, a winch for each seeder box associated with said standard for pivoting said seeder boxes to inclined positions.

8. The all terrain seeding mechanism of claim 4 including at least two of said seeder boxes, said seeder boxes being aligned laterally and having adjacent ends thereof hingedly connected to said standard, and winch means operatively associated with said standard for pivoting said seeder boxes to said inclined position, said seeder boxes having similar hinge means on both ends, said hinge means providing one form of mounting of said seeder boxes in opposite extending relation from said standard and another form of mounting of said seeder boxes in end-to-end relation in one direction.

9. The all terrain seeding mechanism of claim 1 including a soil firming mechanism in combination with said seeder box, means on said soil firming mechanism capable of pulling connection behind a vehicle on which said seeder box is mounted, said soil firming mechanism including a plurality of rings with a rubber soil engaging periphery.

10. The all terrain seeding mechanism of claim 9 wherein said rings on said soil firming mechanism have individual vertical free adjustment for following the contour of the ground on which said roll.

11. The all terrain seeding mechanism of claim 9 including frame means on said soil firming mechanism confining said plurality of rings laterally, and laterally extending shaft means in said frame means, said rings having an opening therethrough that receives said shaft means, said ring opening being of larger diameter than said shaft means whereby to allow said ring to move vertically and adjust to vertical variations in the ground being pressed.

12. The all terrain seeding mechanism of claim 9 wherein said soil firming mechanism includes central and outer frame sections each having a plurality of said rings thereon, said rings having vertical free adjustment for following the contour of ground on which said rings roll, and longitudinal hinge means connecting adjacent frame sections together, said hinged sections having relative pivotal movement to allow up and down pivotal movement of said sections to provide adjustment of the rings to follow the contour of soil on which said rings roll.

13. The all terrain seeding mechanism of claim 12 wherein said outer frame sections are foldable upwardly for reducing the width of the seeding mechanism for transportation or storage.

14. The all terrain seeding mechanism of claim 11 including a bearing sleeve on said shaft means for engaging defining portions of said ring opening.

15. An all terrain seeding mechanism for comprising:
at least one seeder box capable of mounting transversely on the front of a vehicle and capable of spreading seed by driven movements of the vehicle,
a plurality of outlet feed tubes depending in spaced lateraly position from and receiving seed from said seeder box,
and a soil firming mechanism having a drawbar portion capable of pulling connection between a vehicle on which said seeder box is mounted,
said soil firming mechanism including frame means confining a plurality of laterally disposed, closely adjacent rings supported on the ground providing full ground coverage,
and laterally extending shaft means in said frame means,
said rings having an opening therethrough that receives said shaft means.
said ring opening being of larger diameter than said shaft means whereby to allow said rings to move vertically and adjust by gravity to vertical variations in the ground being pressed.

16. A soil firming mechanism for firming soil that has been planted with seed comprising:
a drawbar capable of connection to a driving vehicle,
a plurality of press rings on said drawbar,
frame means on said soil firming mechanism confining said plurality of rings laterally,
and lateral shaft means in said frame means,
said rings having an opening therethrough that receives said shaft means,
said ring opening being of larger diameter than said shaft whereby to allow said rings to move vertically by gravity and adjust to vertical variations in the ground being firmed.

17. The soil firming mechanism of claim 16 wherein said soil firming mechanism includes central and outer frame sections each having a plurality of said rings thereon, and longitudinal hinge means connecting adjacent frame sections together, said hinged sections having relative movement to allow up and down pivotal movement of said sections to provide additional vertical adjustment of the rings to follow the contour of soil on which said rings roll.

18. The soil firming mechanism of claim 16 wherein said outer frame sections are foldable upwardly for reducing the width of the soil firming mechanism for transportation or storage.

19. The soil firming mechanism of claim 16 wherein said press rings comprise rubber tires.

* * * * *